Aug. 17, 1943. L. A. GEBHARD ET AL Re. 22,365

ANTENNA SYSTEM

Original Filed March 11, 1930 2 Sheets-Sheet 1

Inventors
Louis A. Gebhard,
Raymond B. Meyer,
BY
Stone & Buck
ATTORNEY

Aug. 17, 1943. L. A. GEBHARD ET AL Re. 22,365

ANTENNA SYSTEM

Original Filed March 11, 1930 2 Sheets-Sheet 2

Inventors
Louis A. Gebhard,
Raymond D. Meyer,
BY
Stone E. Bush
ATTORNEY

Reissued Aug. 17, 1943 Re. 22,365

UNITED STATES PATENT OFFICE 22,365

ANTENNA SYSTEM

Louis A. Gebhard and Raymond B. Meyer,
Washington, D. C.

Original No. 1,903,811, dated April 18, 1933, Serial No. 434,882, March 11, 1930. Application for reissue May 11, 1943, Serial No. 486,604

6 Claims. (Cl. 250—33)

(Granted under the act of March 3, 1883, as amended April 30, 1928; 370 O. G. 757)

The invention described herein may be manufactured and used by or for the Government for governmental purposes without the payment to us of any royalty thereon.

Our invention relates broadly to high frequency radio communication systems and more particularly to the construction of an antenna system for high frequency communication.

One of the objects of our invention is to provide a construction of antenna system for high frequency radio communication systems which may be accurately adjusted for operation at a selected high frequency.

Another object of our invention is to provide a construction of antenna system which may be readily set or reset for operation at any selected high frequency for securing high efficiency in the operation of radio communication systems.

A further object of our invention is to provide an antenna system of variable capacity for communication at extremely high frequencies with mechanical means for accurately fixing the capacity of the antenna for operation at a selected high frequency.

Still another object of our invention is to provide a construction of high frequency antenna which is readily adjustable with respect to the frame of a transmitter on which the antenna may be mounted, means being provided on the transmitter for indicating the effective extension of the antenna in any given position.

Figure 1:
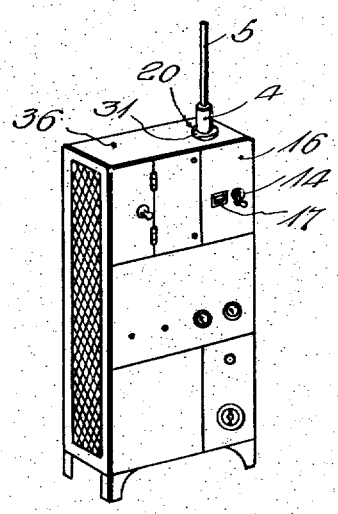
Figure 4:
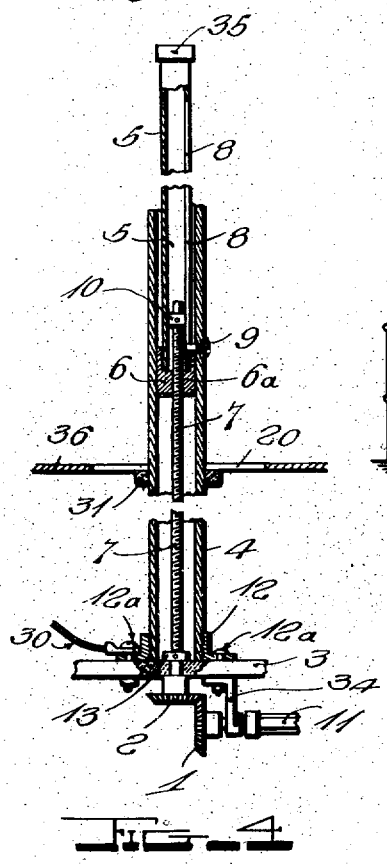
Figures 2, 3:
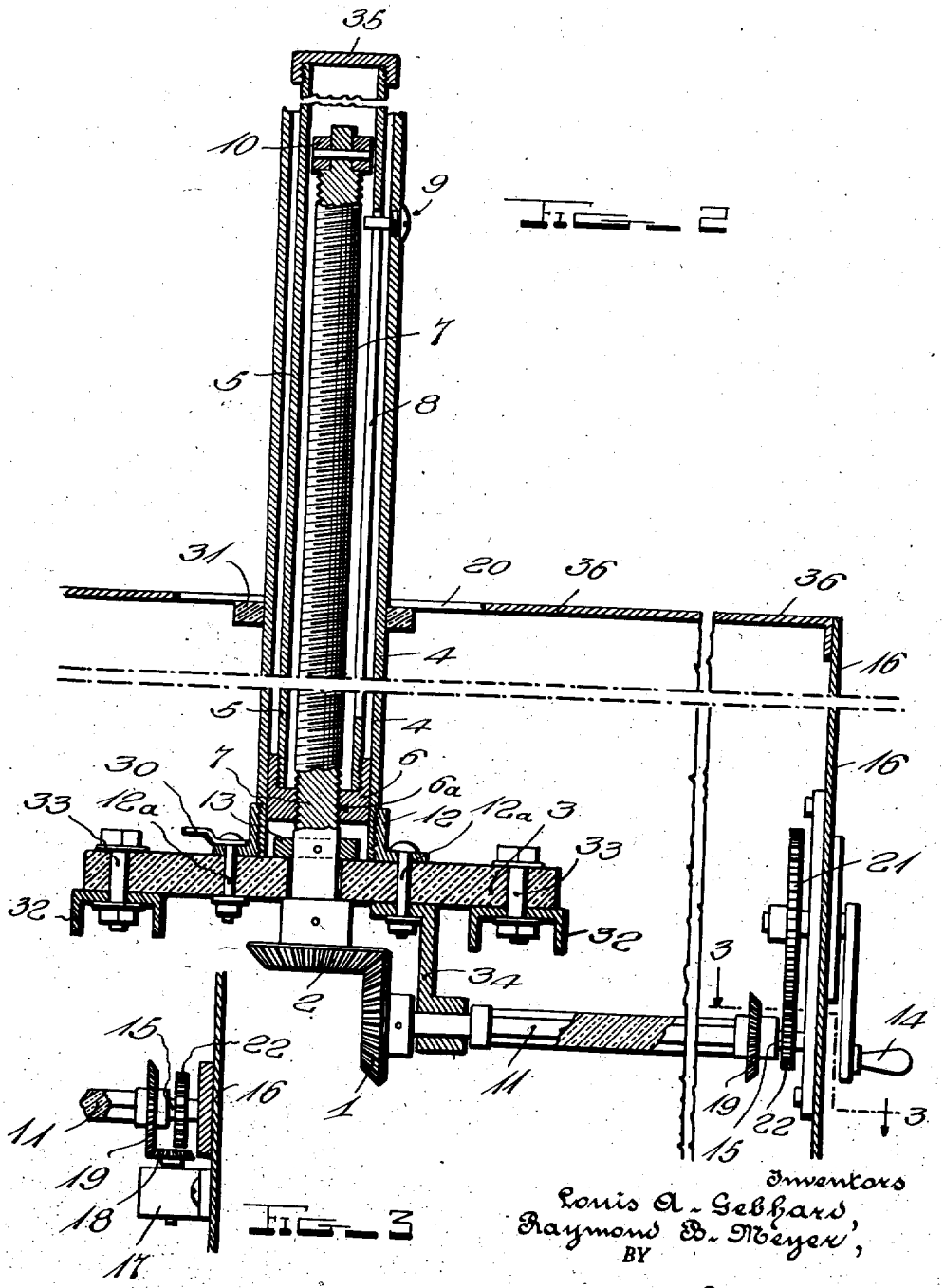

Other and further objects of our invention reside in the construction of a short wave transmitting antenna where the antenna forms an integral part of the transmitter as set forth more fully in the specification hereinafter following by reference to the accompanying drawings, in which:

Figure 1 is a perspective view of the short wave transmitter on which the extensible antenna system of our invention is mounted; Fig. 2 is a cross-sectional view taken through the transmitter of our invention and showing the means which we employ for the projection of the antenna through the transmitter; Fig. 3 is a cross-sectional view through the control means for effecting adjustment of the antenna taken on line 3—3 of Fig. 2; Fig. 4 is a vertical cross-sectional view through the transmitting antenna and showing a fragmentary part of the control means therefor; and Fig. 5 is a schematic view showing the transmitting antenna of our invention in association with a transmitter circuit.

Our invention is directed to an antenna system for operation at extremely high frequencies. We have found that in order to secure a maximum efficiency in transmission at high frequency it is necessary to accurately adjust the antenna to an effective length which is proportional to the frequencies at which the transmitter operates. For compact assembly of the transmitting apparatus with respect to the antenna system, we mount the antenna directly in the frame of the transmitter with control means extending through the front panel of the transmitter for adjusting the antenna to a particular length. We provide a counter mechanism by which the antenna may be extended to a selected length for transmission upon a given frequency and returned to the same setting when it is desired to transmit at that selected frequency. The antenna construction of our invention is extremely compact and affords maximum efficiency in high frequency communication.

Referring to the drawings in more detail, Fig. 1 illustrates the radio transmitter which is equipped with a high frequency antenna system according to our invention. The panel 16 of the transmitter is shown at 16 through which a control crank 14 projects for elevating or lowering the antenna while observing readings of the counter 17 through a sight open in the panel 16 of the transmitter. The antenna is constituted by tubular members 4 and 5 which project through the aperture 20 in the top of the transmitter which is electrically shielded at 36 and on all sides thereof. The antenna is mounted upon a support 3 by means of the collar 12, which is secured on support 3 by means of bolt members 12a which extend therethrough as shown. The metal tube or cylinder 4 is screw threaded into the collar 12 in such manner that tube 4 is erected vertically with respect to the support 3. A bearing 6 is mounted interiorly of the tube 4 and provides a snug sliding fit within tube 4. The center of the bearing 6 is screw threaded as indicated at 6a so that the bearing 6 may be positively driven upward and outward in accordance with the rotation of the drive shaft 7. A thrust collar 13 is secured to the shaft 7 to provide a support and bearing for the interior members of the antenna system. The upper end of shaft 7 is provided with a collar 10 which provides an additional support between the inner tubular member 5 and the shaft 7. A bevel gear 2 is secured to the lower end of the shaft 7 after it passes through the support 3. Bevel gear 1 is provided in engagement with the bevel gear 2 for moving bevel gear 2 in accordance with the operation of shaft 11, which consists of a high frequency insulator. The turning of shaft 11 causes tube 5 to slide within tube 4 thus providing a means of adjusting the effective length of the antenna while the transmitter is in operation. A pin 9 is secured through tube 4 adjacent its upper end and extends far enough into tube 5 so as to engage the longitudinally extending slot 8 therein. This slot 8 extends to within a short distance of each end of the inner tubular member 5. The purpose of the pin 9 and slot 8 is to prevent tube 5 from turning around within tube 4 when the gearing mechanism is actuated. The dimensions of tubes 4 and 5 and of shaft 7 may be of any desired length and diameter, while the ratio existing between gears 1 and 2 and pitch of the thread on 7 may be chosen to give any desired speed of adjustment to the length of the antenna.

Figure 5:
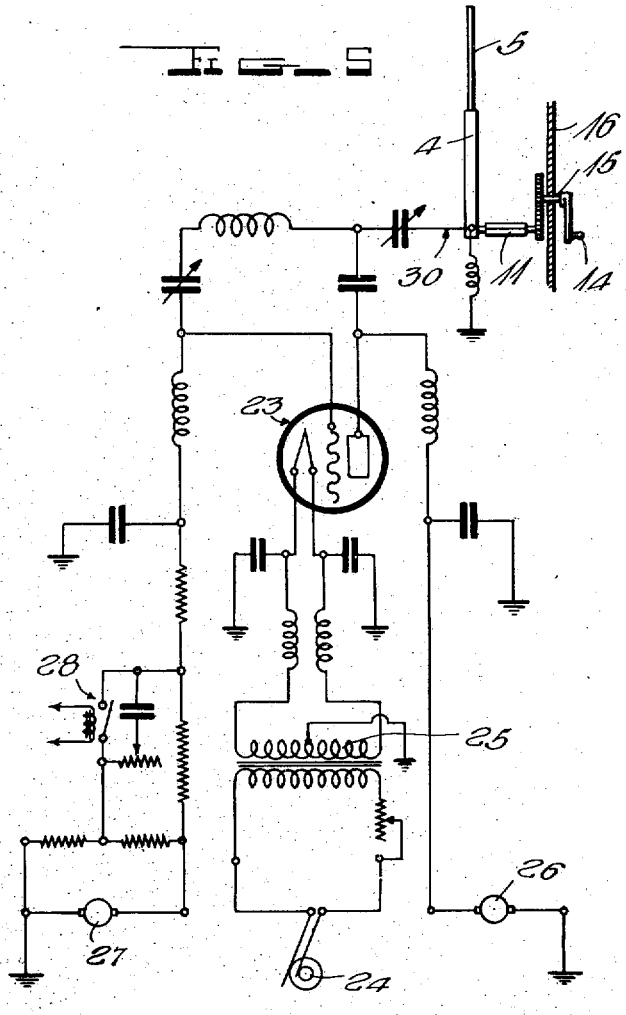

Fig. 5 shows a high frequency oscillator provided with our adjustable antenna. The antenna may form an integral part of the transmitter or may be coupled thereto by means of a radio frequency transmission line. The use of such an antenna permits the antenna to be tuned while power is on the transmitter and enables the length of the antenna to be adjusted with great accuracy. The antenna is rigid and thus retains its constants once the proper adjustment is arrived at, a condition which is necessary at extremely high frequencies. Insulating shaft 11 is operated by means of crank 14 through shaft 15. This shaft 15 may be supported in a bearing in the front panel 16 of the radio transmitter. A counter 17 is provided connected to shaft 15 by means of bevel gears 18 and 19. A window in the front panel 16 permits sighting the dial of the counter 17. This indicating mechanism affords a means of resetting any particular adjustment of the antenna. In order to provide for the proper speed of operation during the raising and lowering of the antenna, we provide a system of gears shown at 21 and 22 intermeshing to impart motion to drive shaft 7 at such speed that the antenna may be raised within a relatively small number of turns of the control crank 14.

In Fig. 5 we have indicated the means of connecting the transmitter with the antenna system. The oscillator has been designated generally by reference character 23 as including grid, cathode and plate electrode. The cathode circuits is heated from an alternating current source and supplied to the cathode from transformer 25. The potential for the plate is supplied from generator 26 while biasing potential for the grid of tube 23 is supplied from generator 27. The keying circuit for the transmitter has been shown at 28. The connection from the oscillator system is taken from the base of the tubular member 24 through the conductor 30 terminating at one of the securing bolts which we have indicated at 12*a*. In order to mechanically steady the transmitting antenna we provide an insulated yoke member 31 extended across the aperture 20 in the top of the transmitter and embracing the sides of the tubular member 4. The base of the tubular member 4 is anchored by bolts 12*a* at such a distance below the top of the transmitter that the center of gravity of the antenna is maintained low so that when the antenna is fully projected there is no tendency for the equilibrium of the transmitter to be upset. The supporting plate 3 formed from insulation material is mounted on panel members 32 extending laterally of the transmitter to which the insulated supporting plate 3 is fastened by means of bolts 33. A bracket 34 depends from insulated supporting plate 3 and provides a bearing for shaft 11. When the transmitter is not in use the telescopic sections may be collapsed one with respect to the other thereby housing the antenna substantially within the transmitter as represented in Fig. 2. The end cap 35 closes the upper end of tubular member 5.

Our invention is directed to an electrically live adjustable antenna element as distinguished from a mechanical supporting mast which is electrically dead. Such mechanical supporting masts have served only as mechanical supports for antenna wires and are not electrically live antenna elements as embodied in our invention. We provide means extending through the telescopic sections of the electrically live antenna element and operative from a remote position by control means for extending and retracting the telescopic sections with respect to each other for adjusting their effective electrical capacity. The said control means is insulated from the means for extending and retracting the telescopic sections so that extraneous capacity effects are not introduced when adjusting the antenna system.

We have successfully used the transmitting antenna of our invention for transmission over a range of 30,000 to 75,000 kilocycles for which the construction of antenna herein has been found to be particularly efficient, but we desire it to be understood that modifications may be made and that no limitations upon our invention are intended other than are imposed by the scope of the appended claims.

What we claim as new and desire to secure by Letters Patent of the United States is as follows:

1. In a radio communication system, an electrically live adjustable antenna element comprising a multiplicity of tubular sections telescopically disposed one with respect to another, means for insulatingly supporting said antenna element adjacent the base thereof, an electrical connection for radio communication apparatus adjacent the base of said antenna element, means extending axially through said sections for controlling the projection and collapse of said sections with respect to each other, and means electrically insulated from said second mentioned means for adjusting said second mentioned means from a remote position for correspondingly controlling the amount of overlap of the sections with respect to each other.

2. An antenna system comprising an insulated support, an electrically live tubular member erected upon said insulated support, a second electrically live tubular member telescopically positioned within said aforementioned tubular member, means extending through said tubular members for shifting one tubular member with respect to the tubular member erected upon said insulated support, gear means mounted adjacent said insulated support, control means connected with said gear means remote from said antenna system for extending and retracting one tubular member with respect to the tubular member erected upon said insulated support, and connecting means adjacent the base of said first mentioned electrically live tubular member for establishing electrical connection with radio communication apparatus.

3. In a high frequency antenna system, a transmitter frame, a radiating antenna element projectible through said transmitter frame and comprising a multiplicity of conductive tubular sections disposed telescopically one with respect to another, screw means extending through said tubular sections for extending or retracting said tubular sections telescopically, a gear carried by said screw means, and a control driving gear mounted to actuate said first mentioned gear for controlling the extension of said tubular sections.

4. In a high frequency antenna system, a transmitter frame, a radiating antenna element projectible through said transmitter frame and comprising a multiplicity of conductive tubular sections disposed telescopically one with respect to another, screw means extending through said tubular sections for extending or retracting said tubular sections telescopically, a gear carried by said screw means, a control driving gear mounted to actuate said first mentioned gear for controlling the extension of said tubular sections, and an insulated control shaft mounted to actuate said driving gear and projecting outside said transmitter frame, whereby the extension of said tubular sections may be manually adjusted from the exterior of said transmitter frame while said transmitter is operating at high voltages.

5. An antenna system comprising an insulated support, an electrically live tubular member mounted on said insulated support, a second electrically live tubular member telescopically slidable with the surface thereof in continuous electrical contact with the surface of said first mentioned electrically live tubular member, means extending axially with respect to said insulated support and through said tubular members for shifting one tubular member with respect to the tubular member carried by said insulated support, means mounted adjacent said insulated support and controlled remotely therefrom for operating said first mentioned means for extending and retracting one tubular member with respect to the tubular member mounted upon said insulated support, and radio frequency connecting means extending from a position adjacent the base of said first mentioned electrically live tubular member for establishing electrical connection with radio communication apparatus.

6. In a radio communication system, an electrically live adjustable antenna element comprising a multiplicity of tubular sections telescopically disposed one with respect to another, means for insulatingly supporting said antenna element adjacent the base thereof, an electrical shield extending adjacent the base of the antenna element and the supporting means therefor, an electrical connection for radio communication apparatus adjacent the base of said antenna element, means extending axially through said sections for controlling the projection and collapse of said sections with respect to each other in spacial relation to said electrical shield, and means electrically insulated from said second mentioned means for adjusting said second mentioned means from a remote position for correspondingly controlling the amount of overlap of the sections with respect to each other and with respect to said electrical shield.

LOUIS A. GEBHARD.
RAYMOND B. MEYER.